Patented Mar. 2, 1954

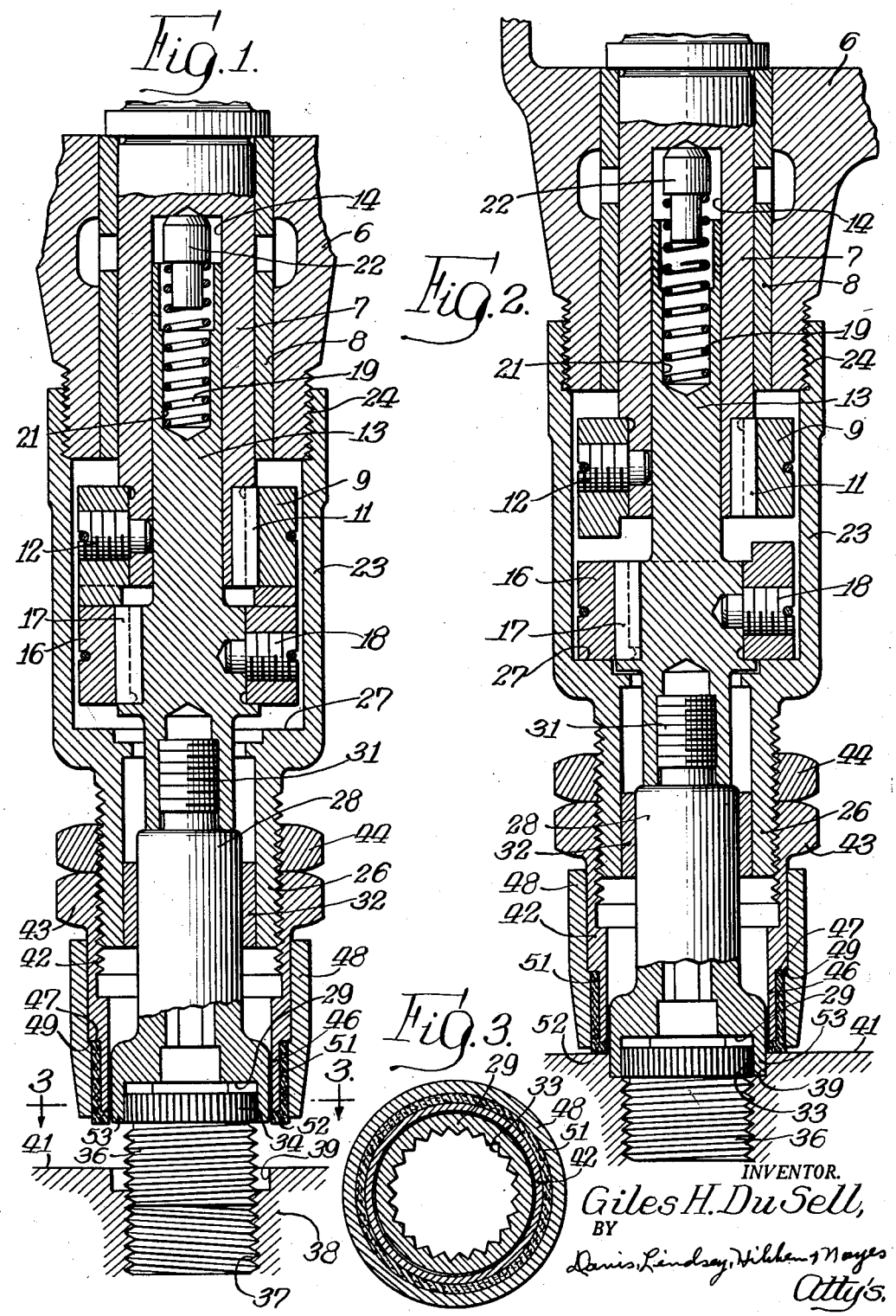
March 2, 1954 — G. H. DU SELL — 2,670,644
ATTACHMENT FOR POWER-DRIVEN ROTARY TOOLS
Filed July 19, 1951
INVENTOR.
Giles H. Du Sell,
BY
Davis, Lindsey, Hibben & Noyes
Atty's.

2,670,644

UNITED STATES PATENT OFFICE 2,670,644

ATTACHMENT FOR POWER-DRIVEN ROTARY TOOLS

Giles H. Du Sell, Aurora, Ill., assignor to Thor Power Tool Company, Aurora, Ill., a corporation of Delaware Application July 19, 1951, Serial No. 237,648

7 Claims. (Cl. 81—53)

This invention relates to attachments for power driven rotary tools, and more particularly to an adjustable control means and socket wrench attachment for such tools.

Threaded steel inserts are commonly used when it is desired to install bolts or studs in certain types of relatively soft structural materials such as wood, plastic, and certain metals such as magnesium or aluminum which lack the ability to hold a bolt or stud screwed directly therein. The insert is generally tubular in form and is provided with external threads or the like for securing the insert in the structural material and also with internal threads for ultimately receiving the bolt or stud which it is desired to install. One particular type of steel insert which has particular advantages is formed with a serrated collar or head portion adapted to be received in a counterbore provided in the surface into which the insert is driven. After the insert is threaded in place, a complementary locking ring having internal and external serrations is forced axially into place in the counterbore over the serrated head of the insert. The internal serrations on the ring interfit with the serrated head of the insert, and the external serrations of the ring broach their way into the main body of the structural material adjacent the counterbore thereby rigidly and permanently locking the insert in place.

It has heretofore been attempted to utilize power driven threaded stud setters in the installation of bolt- or stud-receiving inserts, such stud setters engaging the internal threads of the insert during installation. However, in many cases, and particularly in various uses of the serrated head type insert, this method of installing the insert is objectionable because of the possibility of damaging the internal threads of the insert. In addition, it often becomes very important to obtain highly accurate and controlled installation of the insert to a predetermined uniform depth.

Accordingly, one object of my invention is to provide novel means for installing serrated head inserts of the type described without damage to the internal threads of the insert.

An additional object of the invention is to provide a novel adjustable control for a power driven rotary tool for effecting installation of a fastening element to a desired predetermined depth in a work surface.

Another object of the invention is to provide a novel depth gauge attachment for insert driving tools.

A further object of the invention is to provide a novel depth gauge attachment for insert driving tools which avoids objectionable marring of the work surface into which the insert is threaded.

Still another object of the invention is to provide in a power driven rotary tool a novel combination of a socket wrench and adjustable means for declutching the tool at a predetermined point for installing fastening elements to a controlled depth in a work surface.

Other objects and advantages of the invention will become apparent from the subsequent detailed description taken in conjunction with the accompanying drawing, wherein:

Fig. 1 is a fragmentary vertical sectional view of an attachment for rotary power driven tools comprising one specific embodiment of my invention and showing the device in one position during its use;

Fig. 2 is a view similar to Fig. 1 but showing the device in a different position; and Fig. 3 is a transverse sectional view taken along the line 3—3 of Fig. 1.

Referring now to the drawing, the body portion or casing of a rotary power driven tool is indicated fragmentarily at 6. The tool is provided with a rotating driving spindle 7 extending beyond the lower end of the casing 6 in the usual manner, the spindle being journalled in a sleeve or bearing 8 at the lower portion of the casing and being driven by a suitable motor (not shown) which may be either pneumatic or electric in character. The spindle 7 is provided with a clutch jaw 9 retained on the spindle by a key 11 and a suitable screw 12.

An elongated tool holder or chuck shaft 13 extends into an axial bore 14 in the spindle 7 and is provided with a complementary clutch jaw 16 retained thereon by a key 17 and a screw 18. The tool holder 13 is movable axially within the bore 14 for effecting engagement and disengagement of the clutch jaws 9 and 16 by relative movement between the spindle 7 and the tool holder 13 thereby providing a releasable positive clutch mechanism. A spring 19 is disposed in an axial bore 21 at the upper end of the tool holder 13 and coacts through a thrust plug 22 with the upper end of the bore 14 in the spindle 7 for normally urging the tool holder 13 and spindle 7 in opposite axial directions and for normally maintaining the clutch jaws 9 and 16 out of engagement. A stationary sleeve or housing 23 is threadedly secured, as at 24, to the lower end of the tool casing 6 for enclosing the clutch mechanism and is provided with a threaded lower end 26 of reduced diameter whereby to define a shoulder portion 27 below the clutch mechanism.

Thus, it will be seen that the clutch jaws 9 and 16 constitute a releasable positive two-jaw clutch which is engageable and disengageable in response to relative axial movement between the spindle 7 and the tool holder 13. The spring 19 normally urges the tool holder 13 and its clutch jaw 16 away from the spindle 7 into engagement with the shoulder 27 for releasing the clutch. However, axial pressing movement, as hereinafter described, of the tool against the work permits the spindle 7, casing 6, and sleeve 23 to move as a unit in the direction of the work against the action of the spring 19 thereby engaging the clutch jaws 9 and 16 to effect driving of the tool holder 13.

An elongated tool member 28 in the form of a socket wrench having a socket portion 29 at its lower end is rigidly secured by a threaded connection 31 to the lower end or chuck of the tool holder 13. The socket wrench 28 is journalled in a bushing 32 fitted in the lower end 26 of the stationary sleeve 23. The socket portion 29 of the tool member 28 is formed with internal serrations 33 (Fig. 3) adapted to engage and interfit with the correspondingly serrated head portion, indicated at 34, of a threaded insert 36 of the type hereinbefore described.

During use of the device a threaded bore or hole 37 is first formed in the parent body of work material indicated at 38. A smooth counterbore 39 is provided at the outer end of the threaded hole 37 adjacent the work surface, indicated at 41, this counterbore being of the proper diameter to accommodate a separate serrated locking ring (not shown) as hereinbefore described. To effect installation of the threaded insert 36, the serrated head portion 34 of the insert 36 is placed in position in the serrated socket end 29 of the tool member 28 and the entire tool is then pressed axially toward the work surface with the leading end of the insert 36 aligned with the threaded hole 37. As seen in Fig. 1, this axial pressure on the tool causes the clutch jaw 9 on the spindle 7 to move relative to the tool holder 13 into engagement with the clutch jaw 16, the spring 19 being compressed during the relative axial sliding movement of the tool holder 13 and the spindle 7.

To insure installation of the insert 36 to a predetermined uniform depth in the threaded hole 37 my invention provides an adjustable control device which automatically declutches the clutch jaws when the desired depth has been attained. The device comprises an inner sleeve member 42 having a flange 43 at one end and being internally threaded adjacent this end for adjustably attaching the sleeve to the threaded end 26 of the stationary sleeve 23. A lock nut 44 is provided on the threaded end portion 26 which coacts with the flange 43 for rigidly locking the sleeve member 42 in predetermined adjusted position axially of the sleeve 23. The opposite or lower end of the sleeve member 42 is provided with a portion 46 of reduced diameter whereby to define a radial shoulder 47. An outer sleeve member 48 is rigidly secured, preferably by press fit, in concentric relation around the inner sleeve member 42 and the lower portion of the outer sleeve member 48 is spaced radially outwardly from the reduced end portion 46 of the inner sleeve member 42 to provide an annular clearance therebetween. A radial shoulder 49 is formed in the outer sleeve member 48 for engagement with the shoulder 47 on the inner sleeve member 42 whereby to position the outer sleeve 48 relative to the inner sleeve 42.

A non-metallic annular bushing or stop member 51 is frictionally fitted and retained in the clearance space between the reduced end portion 46 of the sleeve member 42 and the adjacent portion of the outer sleeve member 48. This stop member 51 may conveniently be made of fiber or the like but it will be understood that any suitable relatively rigid protective material which will not scratch the surface of the work material may be used. The outer end of the annular stop member 51 has an inwardly directed flange portion 52 which extends over the outermost end of the sleeve member 42 for completely covering the same. The outermost end of the sleeve member 48 extends slightly beyond the corresponding end of the inner sleeve member 42 for retaining the flange portion 52 in place.

In Fig. 1, the tool is shown in the process of driving the insert 36 into the threaded bore 37 of the work material 38. This threading action of the insert 36 into the hole 37 continues until the flanged end 52 of the protective stop member 51 abuts the work surface 41 of the work material. At this point, axial movement of the sleeves 48 and 23, casing 6, and spindle 7 toward the work surface 41 is arrested but the clutch jaws 9 and 16 are still in engaged position so that the socket wrench 28 continues to rotate and thread the insert 36 down further into the hole 37. Upon further rotation of the socket wrench 28 and tool holder 13, the tool holder moves axially toward the work under the force of the spring 19. Rotation of the tool holder 13 and forward axial movement thereof continues until the clutch jaw 16 moves into disengaged position away from the clutch jaw 9 whereupon operation of the tool ceases. During the continued axial advancement of the socket wrench 28 after the stop member 51 of the depth gauge attachment has engaged the work surface 41, it will be seen that the skirt portion, indicated at 53, on the socket end 29 of the tool 28 is received in the annular counterbore 39.

Because of the fact that the flanged outer end 52 of the stop member 51 projects beyond the outermost ends of the sleeve members 42 and 48, it will be seen that the work surface 41 is completely protected from disfiguration or marring since there is no possibility of the metallic sleeve members hitting this surface. It will be understood that by properly adjusting the sleeve member 42 relative to the threaded end 26 of the stationary sleeve 23 and by locking the sleeve 42 in position with the locking nut 44, the tool can be regulated to effect automatic declutching of the jaws 9 and 16 at a predetermined point whereby to drive the threaded insert 36 to any desired uniform depth in the preformed threaded hole 37.

Although the rotary tool can be held by hand, it is preferable to utilize a suitable tool support in order to insure that the tool is held at a 90° angle with respect to the work surface. This perpendicular relation between the tool and work surface is desirable in order to obtain uniform operating results with the depth gauge attachment.

It will be seen from the foregoing that my invention provides a control device for installing threaded inserts to a controlled depth in a parent material of a relatively soft nature and without danger of disfiguring or marring the outer work surface of the material. In addition, the invention provides a highly efficient means for installing threaded inserts of the serrated head type without danger of damaging the internal threads of the insert.

Although the invention has been described in connection with a specific structural embodiment thereof, it will be understood that various modifications and equivalent structures may be resorted to without departing from the scope of the invention as defined in the appended claims.

I claim:

1. An attachment for use with a power driven rotary tool having a rotating driving spindle, said attachment comprising an elongated shiftable tool holder adapted to be mounted at one end thereof coaxially with the spindle for relative axial movement therebetween, two-part releasable clutch means having one part adapted to be secured on the spindle and a complementary part carried on said tool holder, elongated housing structure rigidly connectible at one end thereof to the tool body and enclosing said tool holder and said clutch means, spring means adapted to coact between the spindle and said tool holder for urging the same away from each other to disengage said clutch means, said clutch means being engageable in response to relative axial movement of the spindle and said tool holder toward each other, a socket wrench carried at the opposite end of said tool holder, adjustable sleeve means carried at the opposite end of said housing structure adjacent said socket wrench, and means for rigidly locking said sleeve means in predetermined adjusted position axially of said housing structure, said sleeve means being adapted to engage a work surface for permitting said socket wrench to advance a predetermined distance beyond said sleeve means until said clutch means disengages under the pressure of said spring means.

2. A device attachable to a power driven rotary tool having a rotary driving spindle for use in installing in a work surface a threaded insert of the type having a head portion adapted to fit into an enlarged counterbore in the work surface, said device comprising an elongated shiftable tool holder adapted to be mounted at one end thereof coaxially with the spindle for relative axial movement therebetween, two-part releasable clutch means having one part adapted to be secured on the spindle and a complementary part carried on said tool holder, elongated housing structure rigidly connectible at one end thereof to the tool body and enclosing said tool holder and said clutch means, spring means adapted to coact between the spindle and said tool holder for urging the same away from each other to disengage the clutch means, said clutch means being engageable in response to relative axial movement of the spindle and said tool holder toward each other, a socket wrench carried at the opposite end of said tool holder and having a gripping portion adapted to engage the head of a threaded insert for installing the same in a preformed bore and counterbore in a work surface, adjustable sleeve means carried at the opposite end of said housing structure adjacent said socket wrench, and means for rigidly locking said sleeve means in predetermined adjusted position axially of said housing structure, said sleeve means being adapted to engage the work surface but permitting said socket wrench to advance axially therebeyond with the gripping portion thereof being received within the counterbore in the work surface until said clutch means is disengaged by the action of said spring means whereby to effect installation of the insert to a desired predetermined depth in the work surface.

3. In a power driven rotary tool having a forwardly extending driving spindle, an attachment comprising an elongated shiftable tool holder mounted coaxially with said spindle, a socket wrench carried at the forward end of said tool holder and adapted to engage a fastening element for driving the same into a work surface, a releasable and interengageable clutch means provided on said tool holder and on said spindle rearwardly of said socket wrench, spring means for normally urging said tool holder and said spindle axially away from each other to disengage said clutch means, said clutch means being engageable for driving the tool holder in response to axial pressing movement of the socket wrench and the fastening element gripped thereby against the work surface, a casing surrounding said clutch means and having a threaded end portion adjacent said socket wrench, a control sleeve secured in axially adjustable relation at one end thereof to the threaded end portion of said casing around said socket wrench and permitting axial movement of said wrench relative thereto, and locking means for retaining said sleeve in predetermined axially adjusted position, the fastening element when in the socket wrench being adapted to project beyond the opposite end of said sleeve for engaging the work surface with said opposite end of said sleeve spaced from the work surface during the initial stage of installation of the fastening element but said opposite end of said sleeve being adapted to engage said work surface during the final stage of the installation whereby to permit said socket wrench to advance a predetermined distance beyond said opposite end of said sleeve until said clutch means is disengaged under the pressure of said spring means for installing the fastening element to a controlled predetermined depth in the work surface.

4. A depth gauge attachment for use with a power driven rotary tool having an elongated tool member mounted in axially shiftable relation to the tool body for installing a fastening element in a work surface, said attachment comprising an adjustable sleeve having internal threads at one end thereof for adjustably attaching the sleeve to the tool body around the tool member, means for locking the sleeve in adjusted axial position on the tool body, and a non-metallic stop member secured at the opposite end of said sleeve and extending beyond said opposite end for engaging the work surface to prevent disfiguration and marring of the surface.

5. In a power driven rotary tool having an elongated axially movable tool member adapted to grip a fastening element for installing the same in a work surface, a releasable clutch engageable in response to axial pressing movement of the tool member and a fastening element gripped thereby against the work surface, and spring means normally urging the clutch to disengaged position; a depth gauge attachment comprising a metallic sleeve adjustably secured at one end thereof to the tool around said tool member, means for rigidly locking said sleeve in predetermined adjusted position axially of the tool, said tool member being mounted for axial movement relative to the tool and said sleeve, and a non-metallic annular protective member secured at the opposite end of said sleeve and adapted to engage the work surface to protect the surface from disfiguration and marring while said tool member moves axially to a predetermined extent beyond said opposite end.

6. A depth gauge attachment for use with a power driven rotary tool having an elongated tool member mounted in axially shiftable relation therewith, said attachment comprising an adjustable inner sleeve member having internal threads at one end for securing the same in axially adjustable relation on the tool around said tool member, locking means for retaining said inner sleeve member in predetermined axially adjusted position on the tool, said inner sleeve member being formed with a portion of reduced diameter at its opposite end, an outer sleeve member rigidly secured in concentric relation on said inner sleeve member and spaced radially from said portion of reduced diameter on said inner sleeve member whereby to define an annular clearance space therebetween, and a non-metallic annular stop member frictionally retained in said clearance space and extending beyond the outer ends of said sleeves for engaging the work surface to prevent disfiguration and marring of the same.

7. A depth gauge attachment for use with a power driven rotary tool having an elongated tool member mounted in axially shiftable relation therewith, said attachment comprising an adjustable inner sleeve member having internal threads at one end for securing the same in axially adjustable relation on the tool around said tool member, locking means for retaining said inner sleeve member in predetermined axially adjusted position on the tool, said inner sleeve member being formed with a portion of reduced diameter at its opposite end, an outer sleeve member rigidly secured in concentric relation on said inner sleeve member and spaced radially from said portion of reduced diameter on said inner sleeve member whereby to define an annular clearance space therebetween, said outer sleeve member extending at its outer end slightly beyond the outer end of said inner sleeve member, and a non-metallic annular stop member frictionally retained in said clearance space and being provided with a flange portion extending radially inwardly adjacent its outer end, said flange portion extending beyond the outer end of said outer sleeve member and covering the outer end of said inner sleeve member for engaging the work surface to prevent disfiguration and marring of the same.

GILES H. DU SELL.

References Cited in the file of this patent

UNITED STATES PATENTS

| Number | Name | Date |
|---|---|---|
| 171,353 | Conway | Dec. 21, 1875 |
| 915,568 | Douglas | Mar. 16, 1909 |
| 1,360,136 | Moore | Nov. 23, 1920 |
| 1,487,746 | Lamb | Mar. 25, 1924 |
| 2,127,855 | Baumgratz et al. | Aug. 23, 1938 |
| 2,257,089 | Caminez | Sept. 20, 1941 |
| 2,272,279 | Schindel | Feb. 10, 1942 |
| 2,394,348 | Wilhide | Feb. 5, 1946 |
| 2,484,364 | Whitledge | Oct. 11, 1949 |
| 2,518,049 | Mosier | Aug. 8, 1950 |
| 2,570,164 | Shaff | Oct. 2, 1951 |